United States Patent [19]

Larsson

[11] 4,042,336
[45] * Aug. 16, 1977

[54] TIME TEMPERATURE INTEGRATING INDICATOR

[75] Inventor: Raymond P. Larsson, Denville, N.J.

[73] Assignee: Bio-Medical Sciences Inc., Fairfield, N.J.

[*] Notice: The portion of the term of this patent subsequent to Jan. 13, 1993, has been disclaimed.

[21] Appl. No.: 615,300

[22] Filed: Sept. 22, 1975

Related U.S. Application Data

[63] Continuation-in-part of Ser. No. 469,851, May 14, 1974, Pat. No. 3,946,611.

[51] Int. Cl.² ............................................. G01N 21/06
[52] U.S. Cl. ............................ 23/253 TP; 23/254 R; 73/339 R; 73/356; 73/358; 116/114.5
[58] Field of Search .................. 73/339 R, 356, 358; 116/114.5; 23/253 TP, 254 R; 426/88; 252/408

[56] References Cited
U.S. PATENT DOCUMENTS

| 2,671,028 | 3/1954 | Clark | 116/114.5 |
| 3,751,382 | 8/1973 | Jungberg et al. | 252/408 |
| 3,932,134 | 1/1976 | Fang | 116/114.5 |

*Primary Examiner*—Richard E. Aegerter
*Assistant Examiner*—Willis Little
*Attorney, Agent, or Firm*—Anthony Lagani, Jr.

[57] ABSTRACT

The temperature history of a product is visually displayed as a color front on an indicator, the distance of front advancement being a function of the temperature time integral. The indicator measures the gas generation in a first compartment by a wick in a second compartment, the wick also being in communication with the first compartment. Optionally, a gas permeable film separates the gas generating material and the wick. The indicator is fine tuned for time temperature integral by incorporating into the wick a quantifier with which the gas generated reacts preferentially.

11 Claims, 5 Drawing Figures

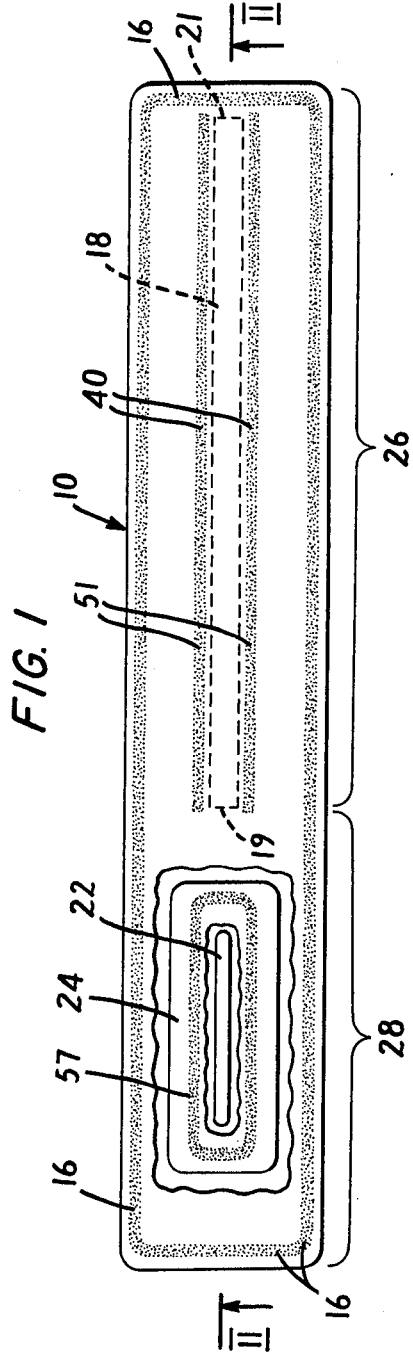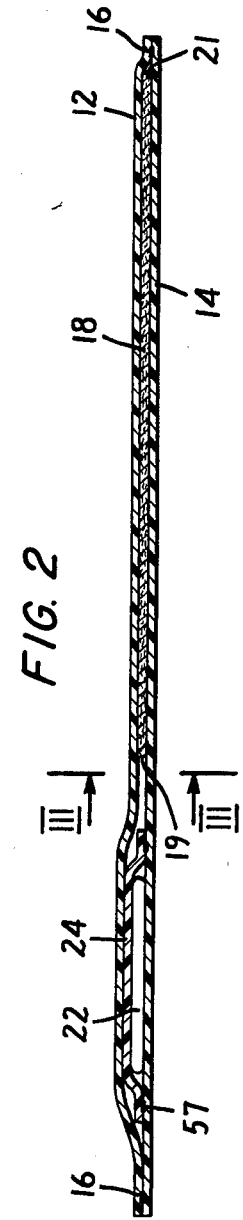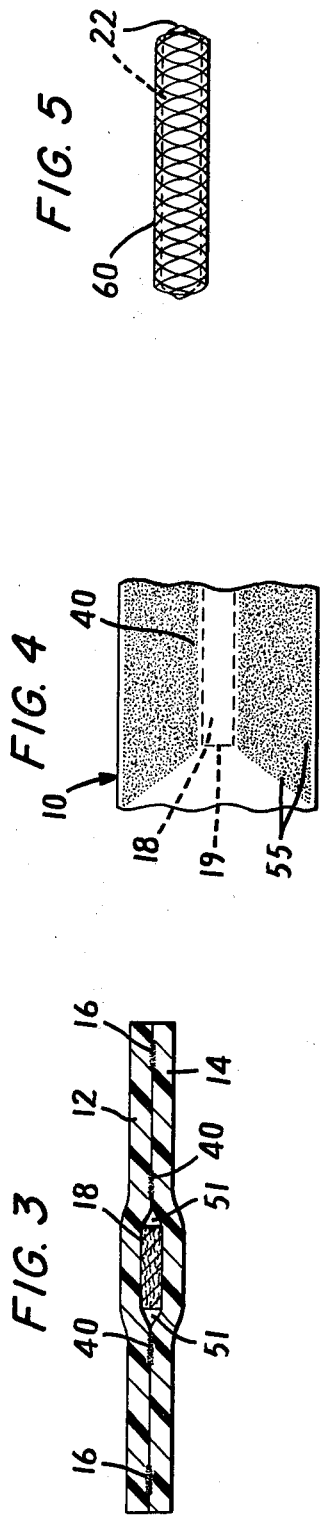

TIME TEMPERATURE INTEGRATING INDICATOR

CROSS REFERENCE TO RELATED APPLICATIONS

This application is a continuation-in-part of U.S. patent application Ser. No. 469,851 filed May 14, 1974 now U.S. Pat. No. 3,946,611

BACKGROUND OF THE INVENTION

The present invention pertains to an indicator system which visually displays the time-temperature integral to which a product has been exposed.

The desirability of detecting whether or not a frozen product has been allowed to thaw has long been recognized and numerous tell-tale devices are described in the literature. One class of these relies upon material which is frozen but which melts at some preselected temperature so as to irreversibly activate an indicator, either chemically or physically. Typically of these devices are those described in the following U.S. patents:

| Nos. | 1,917,048 | Nos. | 2,753,270 | Nos. | 2,955,942 |
|---|---|---|---|---|---|
| | 2,216,127 | | 2,762,711 | | 3,047,405 |
| | 2,277,278 | | 2,788,282 | | 3,055,759 |
| | 2,340,337 | | 2,823,131 | | 3,065,083 |
| | 2,553,369 | | 2,850,393 | | 3,194,669 |
| | 2,617,734 | | 2,852,394 | | 3,362,834 |
| | 2,662,018 | | 2,951,405 | | 3,437,010 |

All of the above devices merely signal "thaw" with no attempt to measure the period during which the product is thawed or the temperature which the product attains while thawed.

A second class of known indicators utilizes diffusion or capillary action of a liquid on a wick or similar permeable member. These devices while often cumbersome, provide some degree of gradation and are typified by the devices of the following U.S. Patents:

| Nos. | 2,560,537 | Nos. | 3,243,303 |
|---|---|---|---|
| | 2,716,065 | | 3,414,415 |
| | 2,951,764 | | 3,479,877 |
| | 3,118,774 | | |

The majority of the prior art devices however are directed primarily at the phenomenon of thawing and the attendant damage which occurs. It is now recognized that various natural and synthetic materials deteriorate with the passage of time even when taking the precaution of storing under adequate refrigeration. This is true even with such additional or alternative precautions as packaging in an inert atmosphere, sterilization or adding spoilage retardants. Thus, for example, foods, films, pharmaceuticals, biological preparations and the like, can demonstrate decomposition with the passage of time, even when sterilized or maintained at sufficiently low temperatures to preclude microbiological degradation. Such decomposition occurs for various reasons, including strictly chemical reactions, such as oxidation, and enzymatic processes. Frozen foods and ice cream show deterioration even when held in a frozen state. A system which would monitor such decomposition or deterioration would be extremely valuable. The deterioration kinetics involved in such processes however, are exceedingly complex. For example, while it is clear that deterioration is a function of temperature, the rate of this deterioration of such products can also vary with temperature. One rate of deterioration will exist at a first temperature while a different rate obtains at a second temperature. The total amount of deterioration will depend upon the time at which the product is held at each temperature; i.e., the integral of time and temperature.

The quotient of (a) the rate of change at one temperature of an article's property whose deterioration is being monitored to (b) the rate of change at a lower temperature is often expressed for ten degree increments and represented by the symbol "$Q_{10}$" for the Celsius scale and "$q_{10}$" for the Fahrenheit scale. This quotient is substantially constant within limited temperature ranges.

The practical effect of the foregoing can be seen for example from two comparable samples of frozen food which are processed and packaged at the same time. If in the course of distribution or storage one package is allowed to rise in temperature by 10° or 20° C, even without thawing, its life will be reduced as compared with the other package which was maintained at a lower temperature for its entire storage life since the rate of decomposition of the contents of the first package is accelerated during the storage at the higher temperature. A consumer about to purchase these packages, both of which are now stored at normal freezer temperature, has no way of ascertaining this difference in temperature histories.

Systems have been suggested for monitoring the temperature history of a product. Thus U.S. Pat. No. 2,671,028 utilizes an enzyme such as pepsin in indicator systems while U.S. Pat. No. 3,751,382 discloses an enzymatic indicator in which urease decomposes urea with the reaction products causing a change in the pH of the system. The activity of the enzyme, and thus rate of decomposition, is dependent on temperature so that the change in pH resulting from this decomposition can be monitored by conventional acid-base indicators. This type of system, which appears to be directed at the specific problem of microbiological putrefaction rather than the broader problem of monitoring temperature histories, suffers from the inherent limitation of any enzymatic reaction. Thus while enzyme activity is a function of temperature, it is also sensitive to the very passage of time being measured, enzymatic activity generally decreasing with time. Enzyme activity to pH change and such change is the operative factor in, for example, the system of U.S. Pat. No. 3,751,382. A more sophisticated system is described in U.S. Pat. No. 3,768,976 in which time temperature integration is achieved by monitoring permeation of oxygen from the atmosphere through a film, utilizing a redox dye to provide a visual read out. This device is however dependent upon the presence of atmospheric oxygen and somewhat cumbersome in configuration and dimensions.

A further problem is that the change in rate of quality loss per unit of temperature change differs for different products. Thus the change in the rate of deterioration per unit of temperature change for certain fruits and berries is vastly different from the change in rate for lean meats. The values for dairy products are different from both. For example, within the range of 0° to −20° C, raw fatty meat and pre-cooked fatty meat have $Q_{10}$'s of about 3, whereas raw lean meat and pre-cooked lean meat have $Q_{10}$'s between 5 and 6. Vegetables generally have a $Q_{10}$ of between 7 and 8, whereas fruits and berries have a $Q_{10}$ of approximately 13. Consequently, a system which is dependent on a single enzymatic reaction or the permeability of a given film will be suitable as an indicator only for those materials having a similar slope for their relationship of change of rate of decomposition to temperature. Although U.S. Pat. No. 3,751,382 describes a method for modifying the time at which the indicator's color change occurs, the activation energy of the enzyme system is modified only slightly and the ratio of change in reaction rate per temperature unit remains substantially the same. The same is true of the device described in U.S. Pat. No. 3,768,976 which is dependent solely on gas permeability.

U.S. Pat. application Ser. No. 469,851 filed on May 14, 1974, now U.S. Pat. No. 3,946,611, which application is incorporated herein by reference, teaches a novel indicator system which overcomes the aforementioned prior art problems. The device comprises a gas impermeable envelope in which is enclosed a gas generating means, an indicating means comprising a wick impregnated with a ph sensitive dye and a barrier comprising a rate controlling film to control the rate at which gas leaving chamber in which it is enclosed passes into the compartment which contains the wicking means. The envelope of the device is separated into two compartments, a first gas generating compartment and a second wicking means compartment by a cross seal which although it isolates one chamber from the other is only a partial seal in that one end of the wicking means protrudes into the gas generating compartment. The function of the cross seal is to force the gas generated to move up the wicking means by wicking up the active length and to prevent gas from migrating to the far end of the wick by channeling along the wick.

Another suitable configuration for this device is taught in U.S. Pat. application Ser. No. 515,165 filed on Oct. 16, 1974, now U.S. Pat. No. 3,932,134 incorporated herein by reference. A first compartment for the wick by sealing device utilizes the same components as the earlier described device of U.S. patent application Ser. No. 469,851 now U.S. Pat. No. 3,946,611 However, the gas impermeable envelope is divided into the gas generating chamber and wicking chamber by utilizing a peripheral seal which seals the envelope along the two long sides of the wick and one end. The seal then forms a compartment of larger dimension in which the gas generating means is contained and into which one of the wick protrudes. The structure of these devices are described more fully below.

SUMMARY OF THE INVENTION

It has surprisingly been found that in a time/temperature integration comprising a gas generating means, an indicator means supported on a wick and a rate controlling means for the transmission of the gas generated to the indicator means it is possible to alter the time span over which the device is functional by incorporating into the wick a quantifier reactive with said gas.

Where the gas generated is acidic the quantifier is basic with respect to the gas and where the gas generated is basic the quantifier is acidic with respect to the gas. Typical gas/quantifier systems are ammonia/trichloroacetic acid and acetic acid/sodium hydroxide.

BRIEF DESCRIPTION OF THE DRAWINGS

The present invention will be described in conjunction with the appended drawings in which:

FIG. 1 is a plan view of a temperature-time-integrating indicator device constructed in accordance with the principles of the present invention, portions of the upper wall and the ampule positioning strip being broken away for purposes of clarity in depicting constructional details.

FIG. 2 is a longitudinal vertical sectional view as taken along the line II—II in FIG. 1.

FIG. 3 is a transverse sectional view on enlarged scale as taken along the line III—III in FIG. 2.

FIG. 4 is a fragmentary plan view of the device showing an additional manner in which the sealing together of the envelope walls can be carried out.

FIG. 5 is a side view of the ampule in which the gas generating material is confined, the ampule being enclosed in a resilient sleeve.

DETAILED DESCRIPTION

This invention relates to an indicator system suitable for monitoring the time-temperature integrals to which a package has been subjected. More specifically this invention relates to a method for controlling the time-temperature integral period over which the device is functional. The present indicator system is not limited in application to monitoring long storage periods at low temperatures. The same consideration apply to short periods and to high temperatures.

With continuing reference to FIGS. 1-3, there is depicted a temperature time indicator which includes an envelope, 10, comprised of elongated, generally coextensive upper and lower walls, 12 and 14 of gas impermeable material. The walls, 12 and 14 while depicted as single ply components of transparent material could be plural ply and be laminated to include a metal foil layer as well as being in part opaque. The important consideration is that said walls be gas impermeable. Walls, 12 and 14 are joined together to form the envelope structure by sealing them together in a continuous course extending about the periphery of each, e.g., by heat-sealing, the material of the walls of course being compatible to that purpose, and such peripheral seal being shown generally at, 16, in FIG. 2. The device also embodies a wick 18, the wick being disposed longitudinally of the envelope 10, in a longitudinal portion thereof which constitutes an indicating section 26, and being treated with an indicator composition.

The device also includes an ampule 22 disposed in another longitudinal portion of the envelope constituting a gas generation section 28 in which is confined a gas generating material, the ampule being disposed intermediate the upper and lower walls 12 and 14 and being fixedly positioned there-between as by connection of an overlaying gas permeable sheet, 24 with one of said walls, the wick, 18 having one tip end as at, 19 in gas generation section, 28 and its other tip end, 21 remote from said gas generation section.

In accordance with the present invention, there is provided a gas barrier, 40, at each longitudinal side of the wick, 18 the gas barrier extending between walls, 12 and 14 and the instance where walls, 12 and 14 are amenable to heat sealing being provided by effecting a heat sealed joinder of the walls in the pattern depicted best in FIG. 1. The heat seal is positioned immediately adjacent the said wick longitudinal side margins. "Immediately adjacent" as used herein is intended to mean effecting the heat seal as close to the wick as practical manufacturing will permit without causing adherence of any melted wall material to the wick material. Thus any spacing, 51 as may exist between the sides of the wick at the barrier is of insignificant consequence with respect to the possibility of gas transport occurring along said space without making a contact with the wick, 18 at or very close to tip end, 19. In this manner the possibility of random gas molecules transport through said space and into first contact with the wick at location remote from tip end 19 is inhibited.

The important requirement in the construction of the device is that the longitudinal gas barrier extend immediately adjacent the wick side margins substantially along the full length of the wick. If desired, however, the sealed joinder of the envelope walls can be extended laterally outwardly from the wick sides in the pattern, 55, depicted in FIG. 4. Further in accordance with the present invention, the gas generating component is confined within ampule, 22 and the ampule, 22 is fixedly secured to the inner surface of one of the envelope upper and lower walls, in the depicted embodiment the ampule, 22 being fixedly positioned by securing the same to the inner surface of lower wall, 14 with the gas permeable sheet, 24 the latter being heat sealed to the lower wall in the generally oval course seal pattern, 57 depicted in FIG. 1. The ampule, 22 in which the gas generating material is confined desirably is an elongated component, closed at its ends and made of a frangible material, glass being preferred. Thus, when it is desired to activate the device, the user need only apply a bending force to the envelope in the region of the position of the ampule and generally applied intermediate the ends of the ampule to fracture the same and permit the gas to escape in the first section 28, of the envelope from whence it can flow onto the wick located in the second section 26. To provide that when ampule, 22 is ruptured, resulting jagged particles of the same will not pierce or damage any of the envelope structure, the ampule can be enclosed in a resilient sleeve, 60, as shown in FIG. 5, the resilient sleeve for example being a braided fiberglass member. It will be obvious to those skilled in the art that the gas generating material need not necessarily be sealed in an ampule. The only necessary requirement is that it be contained and isolated from the wick prior to activation. Furthermore, the ampule or other means for isolating the gas generating material can be completely enclosed in a pouch of the gas permeable sheet, 24. In that event the pouch must have a gas tight seal about its periphery. The pouch itself need not be heat sealed to the walls of the gas barrier.

Upon rupture of the ampule, 22 and after an initial induction period during which the partial pressure of the gas rises in chamber formed by the gas permeable sheet, 24 the gas permeates across film, 24, to the wick, 18. The gas is then absorbed into wick 18. The rate of gas generation by the gas generating material is a function of temperature and the amount of gas which thus passes through the permeable film, 24 is in turn a function of temperature. If wick, 18 is constructed with a substantially constant cross-section, the distance which the gas advances along wick means, 18 will thus be a direct function of the time-temperature integral to which the device has been subjected. Deposited on wick, 18 is an indicator composition which produces a color change in the presence of the gas generated by gas generating material. This indicator composition can vary widely but is selected so as to be responsive to the particular gas generated by gas generating material. Since this indicator composition produces a color change in the presence of the gas, an advancing front will be observed on wick means, 18 in the indicating section, 26. The length of advancement corresponds to the time-temperature integral to which the device has been exposed and can be read through the incorporation of a graduated scale and appropriate indicia associated with the wick means.

The indicator composition may be a pH sensitive dye. Alternatively, it may be a composition which complexes with the gas generated to produce a color change.

Illustrative non-limiting examples of pH sensitive dyes useful as indicator compositions in the practice of this invention are phenolphthalein, xylenol blue, nile blue A, m-cresol purple, bromocresol green, O-cresol red, cyanidine chloride, bromocresol purple, alizarin, thymol blue, bromophenol red, methyl red, acid fuchsin, brilliant yellow, logwood extract, bromthymol blue, phenol red, phenolphthalein, etc.

Various compounds such as copper or cobalt halides which can form complexes (e.g. with ammonia) which exhibit a color change upon complexing may be used as the indicator.

An additional compound preferably included in the wick is a quantifier material whose function is to fix the time interval over which the time-temperature indicator is operative. Although the temperature and hence the $Q_{10}$ sensitivity of the time-temperature indicator is determined by the temperature coefficients of both the vapor pressure of the gas generated and the permeability of the rate controlling film, 24, (RCF); the timing response of the indicator, on the other hand, is determined by the amount of quantifier impregnated on the wick, as well as the nature, thickness, and effective area of the RCF.

Variations in the quantity of quantifier are best accomplished by controlling its concentration in an impregnating solution. For example, where the quantifier material is tartaric acid, a solution is prepared of 0.2N tartaric acid in ethanol and glycerol, the glycerol comprising 20% in the volume of the solution, and 0.2% of phenol red based on the total solution. The wick is immersed in the solution and the excess material squeezed out by passing the saturated wick through a roll nip and allowing the wick to air dry.

Where the RCF is polypropylene of an area of about 525 $mm^2$ and the gas generating material is $(NH_4)_2CO_3$, the indicator based on a wick prepared in the above matter has a time scale of 0° F of about 600 days for a $\frac{1}{4} \times 4$-inch wick of 6 mil Whatman No. 114 filter paper. This time scale may be shortened by reducing the concentration of quantifier material in the impregnating solution.

The requirements of the quantifier are that it (1) have a low volatility e.g. no substantial loss over the life of the device and (2) react rapidly and stoichiometrically with the gas generated to form a stable compound.

By reacting rapidly it is meant that the reaction rate of the quantifier with the gas is sufficiently rapid so that it consumes the gas generated at least as quickly as the gas permeates through the rate controlling film.

The quantifier itself must be stable and not decompose in the presence of the other constituents of the indicator composition. Hence the quantifier materials of choice are acid or basic compounds which can be dissolved for deposition on this wick. The indicator composition can also include a germicide or bacteriocide as well as the pH indicator and quantifier. It is also desirable to include a humectant in the indicator composition. Preferably the humectant is normally liquid at the use temperature of the device.

Where the gas generated is a basic gas, quantifiers useful in the practice of this invention have dissociation constants ($pK_a$) of about 7 or less; preferably about 6 or less. Illustrate examples of quantifiers useful with basic gases are organic acids such as trichloroacetic acid, maleic acid, malonic acid, succinic acid, lactic acid, cinnamic acid, oxalic acid, glycolic acid, malic acid, tartaric acid, etc., and potassium phosphate (mono basic).

Where the gas generated is an acid, e.g. $C_1 - C_6$ organic acid, the quantifiers useful in the practice of this invention have basic dissociation constants ($pK_b$) of about at least 7, preferably about at least 8. Illustrative examples of such quantifiers are alkali metal compounds such as NaOH, $Na_2CO_3$, $Na_2(HPO_4)$ $K_2(HPO_4)$ $Li_2CO_3$; quartenary ammonium hydroxides such as tetra methyl ammonium hydroxide, benzyl trimethyl ammonium hydroxide etc.; and amines such as imidazole, Tris (hydroxymethyl) aminomethane, quinine, guanidine, etc. Certain quantifiers are preferably used with particular pH sensitive dyes as shown in the table below:

| Gas Generated | Quantifier | pH Sensitive Dyes |
| --- | --- | --- |
| $NH_3$ | Tartaric acid | Phenol red |
| $NH_3$ | Potassium acid phosphate | Cresol red |
| $NH_3$ | Cinnamic acid | Ethyl red |
| Acetic acid | Sodium hydroxide | Methyl red |
| Acetic acid | Quinine | Methyl orange |
| Acetic acid | Sodium carbonate | Cresol red |

The term "quantifier" as used in the specification and claims means a compound which when included in the indicator composition reacts with the gas generated which has passed through rate controlling film so as to delay the reaction of said gas with the pH indicator. The quantifier must have the properties described above at page 12 lines 7-13 The term "rate controlling film" as used in the specification and claims means the aforedescribed permeable film whose permeability with respect to the gas generated is temperature dependent. The term indicator composition means the pH sensitive dye together with any of the optional components of such composition which include humectants, quantifiers, bacteriocides and germicides.

The humectants which are suitable for use in the practice of this invention include both solids and liquids. Such compounds must be unreactive with respect to the gas generated, the quantifier and the pH sensitive dye. Characteristically the humectants should have an equilibrium relative humidity of about 30 to about 80%, preferably about 40 to about 70% more preferably about 45% to about 65% e.g. about 50% to about 60%.

Illustrative examples of such humectants are polyols such as ethylene glycol, propylene glycol, glycerol, mannitol etc.; salts such as sodium iodide, sodium bromide, sodium nitrate, etc.

An alternative to the longitudinal seals described above is a seal transverse and perpendicular to the wick, 18, at or near the end of the wick, 19, near the gas generating section, 28. This transverse seal divides the device into its two sections, 26 and 28. The function of the transverse seals or the heretofore described longitudinal seals is to prevent access to the wick, 18 of the gas generated except by capillary wicking action along the wick, 18 beginning at the end, 19, which protrudes into the gas generating section, 28. Absent these seals, gas would be free to diffuse toward the far end of the wick, 21 thereby giving erroneous readings. The transverse seal is described in detail in U.S. Application Ser. No. 469,851 now U.S. Pat. No. 3,946,611

The gas generation section, 26 can utilize a variety of physical or chemical processes. In its simplest embodiment, the gas generation may involve simple sublimation or vaporization and thus one may utilize any substance which has a high vapor pressure, as for example, water (or ice); iodine; alcohols; hydrogen peroxide; lower alkanoic and aromatic acids, such as acetic acid; acid anhydrides such as maleic anhydride; acid halides, etc. Alternatively the gas generating material can be a salt which decomposes with the generation of a gas, as for example ammonium carbonate, sodium bicarbonate, ammonium acetate, ammonium oxalate, ammonium formate and the like. In those instances in which the rate of gas generation corresponds to the rates being monitored, it is unnecessary to include the barrier film, and gas generating section of the envelope, 28, can have a single chamber. Even in such embodiments, however, it is often desirable to interpose a highly permeable physical barrier which separates the gas generating material from the wick. The permeability of such barriers should be substantially independent of temperature since the rate determining step is the generation of gas. Typical of these are such materials as microporous polypropylene (Celgard) and microporous acrylic polyvinyl chloride on woven cloth (Acropor). When no film is employed, or the film is highly permeable, the rate of sublimation is in part dependent on the available surface area of the gas generating material. In such instances, it is often desirable to impregnate the material on a carrier so that a uniform surface is provided. Alternatively, the film, 24, can divide the gas generating section, 28, into a first and second chamber, as shown in FIG. II. The film may have a more limited gas permeability and one which is temperature dependent. Typical of these temperature dependent rate controlling films (RCF) are polyethylene, polypropylene, nylon esters of polyethylene glycol and terephthalic acid (Mylar), cellulose films and the like. It can be shown mathematically that the contribution of the gas generation and the contribution of gas transport to the $Q_{10}$ of the system are cumulative so that by judicious selection of the two systems it is possible to achieve an overall effect in which the change in rate of gas availability at the wick with changes in temperature parallel the $Q_{10}$ of the product being monitored. Moreover, when a film of limited permeability is utilized, the effect of surface area of the gas generating material is eliminated since gas transport across the film is the rate controlling step. The gas generation process and optionally also the permeability through the film are thus selected so that the change in rate of gas availability at the wick per unit change in temperature approximates the $Q_{10}$ of the product being monitored. The activation energy values of the operative components are useful in this selection since the relationship between $Q_{10}$ and the activation energy is as follows:

$$Q_{10} = e^{10E_A/T_1 T_2 R} \qquad (Eq. 1)$$

where
$E_a$ = the activation energy
$T_1$ = a first temperature in degrees (absolute)
$T_2$ = a second temperature ten degrees lower than $T_1$
and $R$ = gas constant Within, for example, the range of $-10°$ to $-20°$ C, an important region for frozen foods, the following values are obtained:

| $E_a$ | $Q_{10}$ | $q_{10}$ | $E_a$ | $Q_{10}$ | $q_{10}$ |
|---|---|---|---|---|---|
| Kcal/mole | | | Kcal/mole | | |
| 0.0 | 1.00 | 1.00 | 20.00 | 4.54 | 2.31 |
| 5.0 | 1.46 | 1.23 | 22.0 | 5.28 | 2.52 |
| 8.0 | 1.83 | 1.40 | 25.0 | 6.63 | 2.86 |
| 10.0 | 2.13 | 1.52 | 27.0 | 7.71 | 3.11 |
| 12.0 | 2.48 | 1.66 | 30.0 | 9.61 | 3.52 |
| 15.0 | 3.11 | 1.88 | 33.0 | 12.0 | 4.00 |
| | | | 34.0 | 13.0 | 4.16 |

It is thus possible to select gas generating materials and films in which the rates of gas generation and permeability parallel the decomposition rates of various materials, even in the course of temperature fluctuation over a period of time. The wick means can be selected from a wide variety of known materials. These may be simple cellulosic products such as paper or fiber, various synthetic polymeric materials, e.g. polypropylene, polyethylene, polyester of polyamides; glass fiber, paper, alumina, silica gel and the like. The nature of the wick means is relatively unimportant, provided it possesses a sufficient affinity for the gas and indicator composition and is substantially inert to both.

The indicating composition which is deposited on the wick means and which results in a color change in the presence of gas can be a single component or a mixture of components operating together. The particular indicating composition must be selected for the particular gas generated. When, for example, the gas generated is ammonia, the indicator composition can simply include an aqueous medium and a pH sensitive dye, such as methyl red or thymol blue, and an acidic substance of low volatility such as trichloroacetic, benzoic, oxalic or tartaric acid or potassium acid phosphate. Prior to reaction with any ammonia, the dye will display its first (acid) color. Upon reaction with the ammonia the dye displays its second color. Analogous systems are employed with acidic gases.

The indicating composition can alternatively use a redox system to produce the requisite color change. For example, a glass fiber paper wick may be impregnated with a potassium permanganate solution. In such an instance, the gas or vapor generated is one which is susceptible to oxidation, as, for example, thymol or another oxidizable alcohol. As the thymol is absorbed on the wick and advances along its length, it is oxidized by the permanganate which in turn loses its characteristic red color.

It is also possible to utilize an indicator composition which, while not responding to the gas directly, converts it to a material which can be monitored. Thus, for example, in the case of maleic anhydride, the wick may be impregnated with an aqueous base or with an alcoholic base serving as a solvolysis agent. As the anhydride is absorbed in the wick, it is hydrolyzed by the water or alcohol with the generation of maleic acid. This acid can then be monitored by incorporation in the composition of a pH sensitive dye.

The indicator composition can also complex the gas, as with potassium iodide and starch for iodine gas.

The following examples will serve to typify other systems and configurations but should not be construed as a limitation on the scope of the present invention, the invention being defined only by the appended claims.

EXAMPLE 1

A time-temperature indicator is prepared in a configuration similar to that shown in FIGS. 1 and 2. The upper wall is a laminate of 2 mil polyethylene and 1 mil trifluorochloropolyethylene while the bottom wall is 1 mil aluminum foil laminated to 1 mil polyethylene. The gas permeable film is 2 mil polyethylene having an available area of 1 sq. inch. The gas generating material is ammonium carbonate. The wick is Whatman No. 1 filter paper having a width of 0.5 inch. The indicator composition is 0.50 molar aqueous trichloroacetic acid, 20% by volume glycerol and 0.1% methyl red.

Upon activation and equilibration, the ammonia generated by the ammonium carbonate migrated through the polyethylene film and produces a color change in the wick. At $-18°$ C, the front advances at a rate of 0.017 mm/hr. If the sensor is held at $-1°$ C, the front advances at a rate of 0.15 mm/hr. The change in the rate with 10° C increments corresponds to a $Q_{10}$ of 3.7.

EXAMPLE 2

An indicator is prepared as above utilizing, however, iodine as the gas generating material. The indicator composition consists of 10% potassium oidide and 0.1% starch. At $-1°$ C, the front advances at 0.033 mm/hr. while at 22° C, the front advances at 0.15 mm/hr., corresponding to a $Q_{10}$ of about 2.8.

EXAMPLE 3

An indicator is prepared in a configuration similar to that shown in FIGS. 3 and 4, omitting however, the gas permeable film, 24. Thymol is utilized as the gas generating material. The wick is glass fiber paper which is impregnated with 0.01 molar potassium permanganate. A brownish yellow front advances along the initially red strip at a rate of 0.06 mm/hr. at 21° C and 0.0002 mm/hr. at $-1°$ C, corresponding to a $Q_{10}$ of about 5.

EXAMPLE 4

An indicator is prepared in a configuration similar to that shown in FIGS. 3 and 4, omitting, however, the gas permeable film 24. Maleic anhydride is employed as the gas generating material to give a $Q_{10}$ of approximately 4. The indicator composition comprises 0.1M octadecanol, which hydrolyzes the anhydride, and lacmoid as the pH indicator.

EXAMPLE 5

An indicator is prepared as in Example 1, utilizing glacial acetic acid as the gas generating material. This is sealed below a 2 mil film of polyethylene as the gas permeable film, 24. The indicator composition comprises 0.1 molar sodium hydroxide, together with 0.1% thymol blue. The initially blue strip demonstrates a sharp yellow front advancing at a rate of 0.02 mm/hr. at $-18°$ C and 0.25 mm/hr. at 4.5° C, corresponding to a $Q_{10}$ of 3.1.

EXAMPLE 6

The device of this invention was prepared using biaxially oriented polypropylene film having a thickness of 1.25 mils and an area of 1000mm² as the rate controlling film. The gas generating means was formic acid and the quantifier was THAM and pH sensitive dye was as shown in the table below:

| Indicator Composition | Full Scale in Days at Temperature | | | | |
|---|---|---|---|---|---|
| (° F) | 80 | 60 | 40 | 20 | 0 |
| (A) 0.05 THAM[2] 0.2% BTB[3] 20% Glycerol | 8.0 | 20 | 69 | 135[1] | 350[1] |
| (B) 0.10 THAM 0.2% BCP[4] 20% Glycerol | 13.5 | 33 | 103 | 225[1] | 645[1] |

[1]Extrapolated
[2]Tris (hydroxymethyl) aminomethane
[3]Bromothymol blue
[4]Bromocresol purple Hence it evident that the indicator full scale life can be varied by changing the concentration of quantifier.

EXAMPLE 7

The experiments of Example 6 were repeated using acetic acid as the gas generating means.

| Indicator Composition | Full Scale in Days at Temperature | | |
|---|---|---|---|
| (° F) | 80 | 60 | 40 |
| (A) 0.065 M THAM 20% Glycerol 0.2% BTB | 8 | 29 | 135 |
| (B) 0.15 M THAM 20% Glycerol 0.2% BTB | 11 | 38 | 200* |
| (C) 0.30 M THAM | 16 | 60 | 360* |

*Extrapolated

What is claimed is:

1. A temperature time integrating indicator device which comprises:
   a. an elongated envelope having generally co-extensive upper and lower walls each of a gas impermeable material, the walls being sealed together in a continuous course extending about the periphery of each, a first longitudinal portion of said envelope comprising a gas generation section within said envelope and a second longitudinal portion of said envelope comprising an indicating section within said envelope;
   b. a gas generating material disposed in the gas generation section of said envelope;
   c. an elongated wick disposed longitudinally of the envelope with one end thereof in said gas generation section, said wick extending a distance along said envelope indicating section and the other end thereof being remote from said gas generating section;
   d. a rate controlling film separating said wick from the gas generating material;
   e. an indicator composition deposited on said wick, said indicator composition producing a color change in the presence of gas generated by said gas generating material; and
   f. a quantifier incorporated into the indicator composition.

2. The indicator of claim 1 wherein the gas generated is an acidic gas and the quantifier is a compound having a dissociation constant ($pK_b$) of about at least 7.

3. The indicator of claim 2 wherein the $pK_b$ of the compound is at least 8.

4. The indicator of claim 2 wherein the gas is a $C_1$–$C_6$ carboxylic acid.

5. The indicator of claim 4 wherein the gas generated is acetic acid and the quantifier is sodium hydroxide, sodium carbonate, quinine or Tris (hydroxymethyl) aminomethane.

6. The indicator of claim 5 wherein the pH sensitive dye is methyl orange, methyl red, cresol red.

7. The indicator of claim 1 wherein the gas generated is a basic gas and the quantifier is a compound having a dissociation constant ($pK_a$) of about 7 or less.

8. The indicator of claim 7 wherein the gas is $NH_3$ and the quantifier is tartaric acid, potassium acid phosphate or cinnamic acid.

9. The indicator of claim 8 wherein the pH sensitive dye is phenol red, cresol red or ethyl red.

10. The indicator of claim 1 wherein a humectant is included in the indicator composition.

11. The indicator of claim 10 wherein the humectant is glycerol, ethylene glycol, propylene glycol or mannitol.

* * * * *